US012352655B2

(12) United States Patent
Aslan

(10) Patent No.: US 12,352,655 B2
(45) Date of Patent: Jul. 8, 2025

(54) CONDITION TRACKING SYSTEM FOR TRACKING THE CONDITION OF PARTS IN VEHICLES

(71) Applicant: TEKNOROT OTOMOTIV URUNLERI SAN. VE TIC. A.S., Istanbul (TR)

(72) Inventor: Cevat Aslan, Duzce (TR)

(73) Assignee: TEKNOROT OTOMOTIV URUNLERI SAN. VE TIC. A.S., Istanbul (TR)

( * ) Notice: Subject to any disclaimer, the term of this patent is extended or adjusted under 35 U.S.C. 154(b) by 169 days.

(21) Appl. No.: 18/037,338

(22) PCT Filed: Nov. 11, 2021

(86) PCT No.: PCT/TR2021/051189
§ 371 (c)(1),
(2) Date: May 17, 2023

(87) PCT Pub. No.: WO2022/108558
PCT Pub. Date: May 27, 2022

(65) Prior Publication Data
US 2024/0011872 A1 Jan. 11, 2024

(30) Foreign Application Priority Data
Nov. 17, 2020 (TR) .................... 2020/18385

(51) Int. Cl.
*G01M 17/06* (2006.01)
*G01M 17/04* (2006.01)
(52) U.S. Cl.
CPC ............ *G01M 17/06* (2013.01); *G01M 17/04* (2013.01)

(58) Field of Classification Search
CPC .. G01M 17/06; G01M 17/04; B60G 17/0185; B60G 2204/11; B60G 2204/1162; B60G 2400/30; B60G 2400/412; B60G 7/001; B60G 2206/821; B60G 2400/71; B60G 2400/73; B60G 2400/90; B60G 2401/142; B60G 2800/70; B60G 2800/802; B60G 17/0182; B60G 17/019
See application file for complete search history.

(56) References Cited

U.S. PATENT DOCUMENTS

| | | | |
|---|---|---|---|
| 2003/0004624 A1 | 1/2003 | Wilson et al. | |
| 2012/0296514 A1* | 11/2012 | Sohmshetty | ........... G07C 5/008 707/790 |
| 2017/0032592 A1* | 2/2017 | Lu | ........ G07C 5/0808 |

FOREIGN PATENT DOCUMENTS

| | | |
|---|---|---|
| CN | 106080072 A | 11/2016 |
| WO | 2010117762 A2 | 10/2010 |

* cited by examiner

*Primary Examiner* — Timothy P Graves
(74) *Attorney, Agent, or Firm* — Bayramoglu Law Offices LLC

(57) ABSTRACT

A status tracking system for tracking a suspension system or a physical condition of the parts in a steering system in vehicles. The status tracking system includes a sensor unit connected with the body of the part, and a processor unit configured to connect with the sensor unit in a manner receiving the measurements made by the sensor unit as input. The processor unit is configured to obtain measurement information from the measurements it receives, generate status information by classifying the measurement information according to a reference value in a memory unit, and display the status information on a user interface.

14 Claims, 1 Drawing Sheet

CONDITION TRACKING SYSTEM FOR TRACKING THE CONDITION OF PARTS IN VEHICLES

CROSS REFERENCE TO THE RELATED APPLICATIONS

This application is the national phase entry of International Application No. PCT/TR2021/051189, filed on Nov. 11, 2021, which is based upon and claims priority to Turkish Patent Application No. 2020/18385, filed on Nov. 17, 2020, the entire contents of which are incorporated herein by reference.

TECHNICAL FIELD

The invention relates to a status tracking system for tracking the suspension system in vehicles or the physical condition of the parts in the steering system.

BACKGROUND

Suspension and various steering parts, such as the wishbone in vehicles, can be deformed and form cracks over time. The estimated life span of these parts is obtained as a result of the tests; however, as a result of various effects, they can be deformed before the estimated time. Recognition of this deformation by the user may occur at further stages of deformation or may not occur at all. Deformations which are not noticed by the user can cause the parts to break down, as well as serious accidents.

Document CN106080072 describes a system in which the tension of such parts is measured by means of a stress sensor and a fault detection is made accordingly. However, it may cause inaccurate damage detection as the part may be subjected to excessive stress in various situations and conditions in which the vehicle operates, even if it is not deformed.

As a result, all the problems mentioned above have made it necessary to make an innovation in the relevant technical field.

SUMMARY

The present invention relates to a status tracking system in order to eliminate the above-mentioned disadvantages and to bring new advantages to the related technical field.

An object of the invention is to provide a status tracking system that enables instantaneous tracking of the suspension and steering parts in vehicles.

Another object of the invention is to provide a status tracking system that enables the deformations in the parts to be detected with an increased accuracy rate.

The present invention is a status tracking system for tracking the suspension system in vehicles or the physical condition of the parts in the steering system in order to realize all the objects that are mentioned above and will emerge from the following detailed description. Accordingly, its novelty comprises a sensor unit connected with the body of the part, a processor unit configured to connect with the sensor unit in a manner receiving the measurements made by the mentioned sensor unit as input, and the mentioned processor unit is configured to obtain a measurement information from the measurements it receives and generate a status information by classifying the measurement information according to a reference value in a memory unit and display the status information on a user interface. Thus, the status of the parts is monitored instantaneously and abnormal conditions are reported to the user instantly.

A possible embodiment of the invention characterized in that the processor unit is configured to calculate and obtain the variation of the measurement values of the mentioned measurement information in a predetermined range. Thus, instantaneous peak measurements consisting of environmental factors are prevented from causing incorrect status information.

Another possible embodiment of the invention is characterized in that the mentioned sensor unit comprises at least one vibration sensor. Thus, it is determined whether there is a crack in the part.

Another possible embodiment of the invention is characterized in that the sensor unit comprises at least one of the acoustic sensor and the temperature sensor and the electric field sensor. Thus, the likelihood of changes in the measurement values due to environmental factors causing the detection of inaccurate crack or damage detection is reduced.

Another possible embodiment of the invention is characterized in that the processor unit is configured to take into account the measurements it receives from a vehicle sensor unit that generates a signal related to the motion of the vehicle while generating the status information. Thus, the measurements taken from the sensor unit are prevented from causing an incorrect damage detection in cases where the vehicle is on a hill, cornering fast, at high speed, or driving on a rough road.

Another possible embodiment of the invention is characterized in that the mentioned user interface is provided on a user terminal and that the status tracking system comprises a first communication unit for enabling the processor to send data to the user interface.

Another possible embodiment of the invention is characterized in that the mentioned first communication unit is configured to perform wireless communication.

Another possible embodiment of the invention is characterized in that it comprises a second communication unit to ensure that the status information and/or measurements generated by the mentioned processor unit are sent to a server. Thus, information about healthy and damaged parts can be collected on a server and transferred to other users or operators through the instant status server.

Another possible embodiment of the invention is characterized in that the mentioned memory unit is provided on a server. It is ensured that the memory unit is constantly updated, the measurement and status information values and references obtained from other vehicles and as a result, the status information determinations are optimized.

Another possible embodiment of the invention is characterized in that the mentioned sensor unit is located around at least one first region of the part determined to be damaged as a result of the tests previously performed.

REFERENCE NUMBERS IN THE FIGURES

Figure 1:
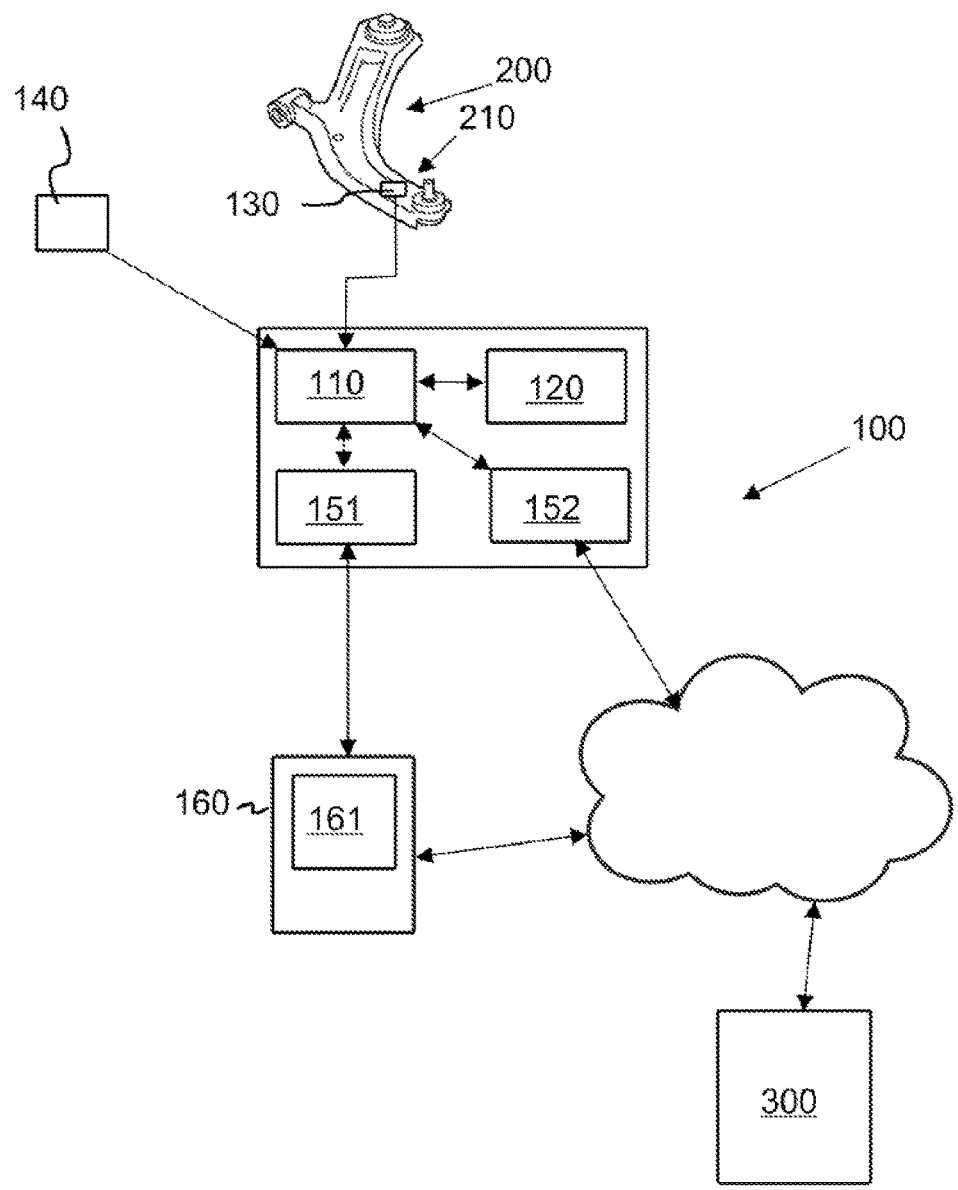
FIG. 1 shows a representative view of the system.
Figure 2:
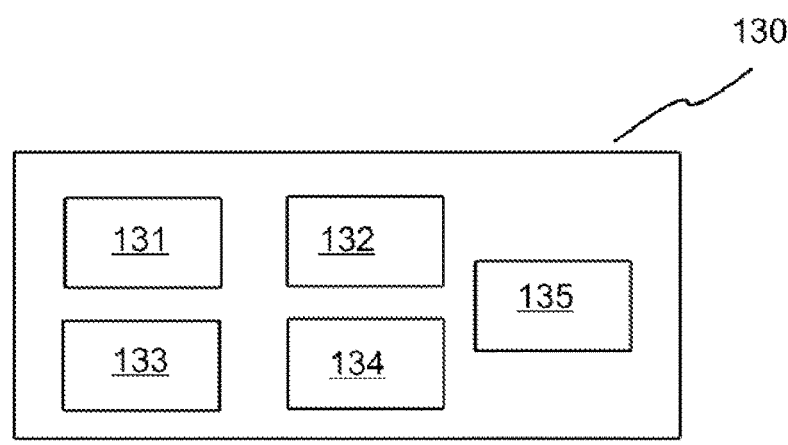
FIG. 2 shows a representative view of the sensor unit.

100 Status tracking system
110 Processor unit
120 Memory unit
130 Sensor unit
131 Temperature sensor
132 Vibration sensor 133 Sound sensor
134 Magnetic field sensor
135 Position sensor
140 Vehicle sensor unit
151 First communication unit
152 Second communication unit
160 User terminal
161 User interface
200 Part
210 First region
300 Server

DETAILED DESCRIPTION OF THE EMBODIMENTS

The subject of the invention is explained with examples that do not have any limiting effect and only for a better understanding of the subject in this detailed description.

The invention is a status tracking system (100) that monitors the condition of the parts (200) in the suspension and steering systems in vehicles. These parts (200) may be parts sensors (200) that are load-bearing or otherwise subjected to force. Cracking may occur in these parts (200) over time, and such cracking may cause accidents. As an example, the said part (200) is a wishbone (suspension fork, suspension triangular arm) in the suspension system in this detailed description of the invention. The invention may also be applied to different parts (200). The vehicles mentioned here are land vehicles such as automobiles, buses, trucks, etc.

With reference to FIG. 1, a sensor unit (130) is provided on the part (200). The sensor unit (130) may include a vibration sensor (132). The sensor unit (130) may further comprise at least one of a temperature sensor (131), an acoustic sensor, and a magnetic field sensor (134). The sensor unit (130) may be disposed in a slot in the part (200). The sensor unit (130) may be connected to the part (200) by adhesive in a possible embodiment of the invention.

A processor unit (110) is configured to receive measurements from the sensors in the sensor unit (130). The processor unit (110) may be a microprocessor. The processor unit (110) is associated with a memory unit (120) to read and write data. The processor unit (110) obtains a measurement information about the measurements it receives. The said measurement information may be a converted version of the measurements to a predetermined format. The measurement information may be the deviation (variation) of the measurements taken at a predetermined time interval in this exemplary embodiment.

The memory unit (120) contains reference values comprising measurement values and/or measurement information obtained as a result of the tests, where the parts (200) are tested in a controlled environment with sensors similar to the sensor unit (130). In these tests, the parts (200) are operated under normal operating conditions and measurements are taken, the measurements are taken by applying various effects and forces, and the reactions of the parts (200) are measured under several circumstances. Therefore, the characteristics of the measurements of the parts (200) in normal working, cracked, etc. conditions are determined and the threshold values can be determined according to the measurement values taken from the sensors. For example, the vibration sensor (132) receives vibration measurement having a particular characteristic when it is associated with a cracked part (200).

In the test phase, the damaged, cracked regions of the part (200) when forced are detected as a first region (210). The sensor unit (130) is placed around the mentioned first regions (210).

The processor unit (110) creates a status information by classifying the measurement information according to the reference values in the memory unit (120). The status information may indicate that the part (200) is cracked, that the part (200) is operating under normal conditions, etc.

The status tracking system (100) includes a user interface (161) associated with the processor unit (110). The user interface (161) may be a display connected to the electronic system of the vehicle. The processor unit (110) may also be the electronic control unit of the vehicle. The user interface (161) may be the display of a user terminal (160) in a possible embodiment. The mentioned user terminal (160) may be a mobile phone, tablet computer, etc. The status tracking system (100) may include a first communication unit (151) for enabling communication between the processor unit (110) and the user terminal (160). the mentioned communication unit can communicate preferably with a short distance wireless communication protocol as one of the protocols known in the art for providing wireless data exchange. The status tracking device may also include a second communication unit (152). The second communication unit (152) is configured to connect to a wide area network such as the Internet or to a cellular network. The processor may send measurement information or status information to a server (300) via the second communication unit (152) or the first communication unit (151) and the user terminal (160). Thus, the condition of the parts (200) in the vehicle can be observed remotely, and the measurements taken from the vehicles can be used to update and increase the reference values. The memory unit (120) may be located on the server (300) in a possible embodiment of the invention. In another embodiment of the invention, the server (300) updates the memory unit (120) in the vehicle periodically.

The processor unit (110) may also be associated with a vehicle sensor unit (140). The vehicle sensor unit (140) may include sensors that measure the condition of the vehicle. The vehicle sensor unit (140) may include sensors that measure the starting and stopping of the vehicle, its speed, orientation, the position of the steering wheel, its inclination in relation to the earth, its acceleration, the force of G applied on the same, etc. The sensor unit (130) produces the status information by considering the information it receives from the vehicle sensor as well as the measurement information. For example, the vibration measurements when the vehicle is on a slope are the same, even though the condition of the part (200) may differ according to the vibration measurements taken while the vehicle is driving on a flat road. The unevenness of the road on which the vehicle advances can also be a factor. The processor unit (110) makes the classification by considering this information.

The status tracking system (100) described above operates as follows:

The processor unit (110) receives information about the vehicle being started from the vehicle sensor unit (140) when the vehicle is started. It receives measurements from the sensor unit (130) and obtains measurement information until a predetermined time elapses. It classifies the measurement information according to the reference values in the memory unit (120) after the predetermined time elapses. It creates a status information as a result of the classification and enables it to be displayed on the user interface (161). For example, if the measurement information detects that it exceeds the thresholds in the reference values, it allows a warning to be generated in the user interface (161) to indicate a crack. The mentioned warning may be audible, visual, vibrational, etc. The status information may also be specified in the user interface (161) to indicate the remaining life of the part (200). For example, if the measurements taken are similar to the characteristics of the parts (200) which have been used slightly more than half of their life, as a result of the classification, they can be displayed by determining the percentage of the remaining life.

In a possible embodiment of the invention, the past measurements may be sent to the server (300) or the user interface (161) instantaneously.

The protection scope of the invention is specified in the attached claims and cannot be limited to the account given for exemplary purposes in this detailed description. It is evident that a person skilled in the art may put forth similar embodiments in light of the above described, without drifting apart from the main theme of the invention.

What is claimed is:

1. A status tracking system for tracking a suspension system in a vehicle, comprising:
    a part sensor unit connected to a body of a part included in the suspension system, and
    a processor unit configured to connect with the part sensor unit in a manner receiving part measurements made by the part sensor unit as input, wherein the part sensor unit comprises a vibration sensor, a temperature sensor and an electric field sensor and wherein the part measurements comprise measurements from each sensor of the part sensor unit;
    wherein the processor unit is configured to obtain measurement information from the part measurements received, generate status information by classifying the measurement information according to a reference value in a memory unit, and display the status information in a user interface.

2. The status tracking system according to claim 1, wherein the processor unit is configured to obtain a variation of measurement values of the measurement information in a predetermined range.

3. The status tracking system according to claim 1, wherein the part sensor unit comprises at least one of an acoustic sensor, a magnetic field sensor and a position sensor.

4. The status tracking system according to claim 1, wherein the user interface is provided at a user terminal, and the status tracking system further comprises a first communication unit for enabling a processor to send data to the user interface.

5. The status tracking system according to claim 4, wherein the first communication unit is configured to make wireless communication.

6. The status tracking system according to claim 1, further comprising a second communication unit to ensure that the status information and/or the part measurements generated by the processor unit are sent to a server.

7. The status tracking system according to claim 6, wherein the memory unit is provided on the server.

8. The status tracking system according to claim 7, wherein the part sensor unit is located around at least one first region of the part corresponding to a region of a different part determined to be damaged as a result of previous tests of the different part.

9. The status tracking system according to claim 1, wherein the part sensor unit is placed in a slot provided in the part.

10. The status tracking system according to claim 1, wherein the part sensor unit is connected to the part with an adhesive.

11. The status tracking system according to claim 1, wherein the part is a wishbone of the vehicle.

12. The status tracking system according to claim 11, wherein the part sensor unit comprises at least one of an acoustic sensor, a magnetic field sensor and a position sensor.

13. The status tracking system according to claim 12, wherein the part sensor unit comprises the acoustic sensor, the magnetic field sensor and the position sensor.

14. The status tracking system according to claim 1, wherein the processor unit is further configured to connect with a vehicle sensor unit and receive inclination measurements made by the vehicle sensor unit, wherein the inclination measurements are measurements of an inclination of the vehicle, and wherein the status information denotes a condition of the part determined by the processor unit based on the inclination measurements in addition to the part measurements.

* * * * *